United States Patent [19]

Kawase et al.

[11] Patent Number: 4,704,897
[45] Date of Patent: Nov. 10, 1987

[54] LOCATING METHOD OF AND THE LOCATING UNIT FOR LEAKS ON PIPING

[75] Inventors: Akira Kawase, Tokyo; Minoru Imamura, Yokohama, both of Japan

[73] Assignee: Tokyo Gas Co. Limited, Japan

[21] Appl. No.: 911,256

[22] Filed: Sep. 24, 1986

[30] Foreign Application Priority Data

Sep. 30, 1985 [JP] Japan .................. 60-217624
Sep. 30, 1985 [JP] Japan .................. 60-217625
Sep. 30, 1985 [JP] Japan .................. 60-217626

[51] Int. Cl.$^4$ ............................................. G01M 3/18
[52] U.S. Cl. ................................................. 73/40.5 R
[58] Field of Search ..................................... 73/40.5 R

[56] References Cited

U.S. PATENT DOCUMENTS 3,977,233  8/1976  Issel ............................... 73/40.5 R
4,586,142  4/1986  Cota et al. ................... 73/40.5 R X
4,651,559  3/1987  Horigome et al. ............. 73/40.5 R

FOREIGN PATENT DOCUMENTS 133148  2/1985  European Pat. Off. .......... 73/40.5 R Primary Examiner—Stewart J. Levy
Assistant Examiner—Joseph W. Roskos
Attorney, Agent, or Firm—McGlew and Tuttle

[57] ABSTRACT

A method of locating a leak in a block of pipes comprises the filling of the pipe with inert gas and the sealing of the pipe. Thereafter, suction is applied to the pipe for drawing air or atmospheric gas into the pipe through the leak. Care is taken to insure that the block of pipes is sealed, except for the suction port and the leak position. Once a layer of air or atmospheric gas is established in the pipe near the leak position, inert gas is drawn from the pipe by the pump, in a direction toward an oxygen or atmospheric gas sensor. By doing this, the layer of air or atmospheric gas is moved along in the pipe from the leak position toward the oxygen sensor. A measurement is taken of the volume of gas being drawn, while the layer of air or atmospheric is being moved along the pipe. The oxygen or atmospheric sensor indicates when the layer of air or atmospheric gas has arrived. This measurement is used in conjunction with a measurement of the volume that has been drawn from the block of pipes to give an accurate measurement of the position of the leak in the block of pipes.

8 Claims, 4 Drawing Figures

LOCATING METHOD OF AND THE LOCATING UNIT FOR LEAKS ON PIPING

FIELD OF THE INVENTION

The present invention relates, in general, to method and apparatus for locating leaks in pipes, and in particular to a new and useful method and sensing device for locating the position of a leak in a gas pipe by using a calculation based on information obtainable from a location which is spaced from the position of the leak. This is particularly useful when the section of pipe carrying the leak is inaccessible, for example, underground or in a building.

DESCRIPTION OF THE PRIOR ART

If a leak should develop in an underground pipe, the gas leaking from the pipe will move through the ground and reach the surface. The position of the leak can generally be obtained by digging out the pipe, starting from the surface of the ground at a location where there is the strongest odor of the gas that has leaked from the pipe. Gas tends to leak out to the ground surface from unexpected positions, however, if the pipe is covered by a road made of concrete or if a building is situated over the location of the gas leak. In such cases, it may be difficult to locate the leak position, even when the leakage of gas is detected through odor, or by using a gas sensor.

In these situations, a method of digging into the ground at several positions for locating the leak using odor or a gas sensor is used. Alternatively, a method of shortening a length of pipeline is adapted for locating the leak position by performing a gas-tight test.

A number of hours and labor are required, however, to perform these methods. Using these methods it is not easy to swiftly cope with an emergency condition. It is also possible that no detection at all can be made if a building is situated over the gas pipe so as to completely cover the pipe.

SUMMARY OF THE INVENTION

An object of the present invention is to provide a method for measuring the distance between an exposed or exposable point on a pipe, and the position of a leak in the pipe, for the purpose of locating the leak position. Another object of the invention is to provide an apparatus for practicing the method.

DESCRIPTION OF THE PREFERRED EMBODIMENTS

An embodiment of the invention is now described on the basis of the attached drawing.

Figure 1:
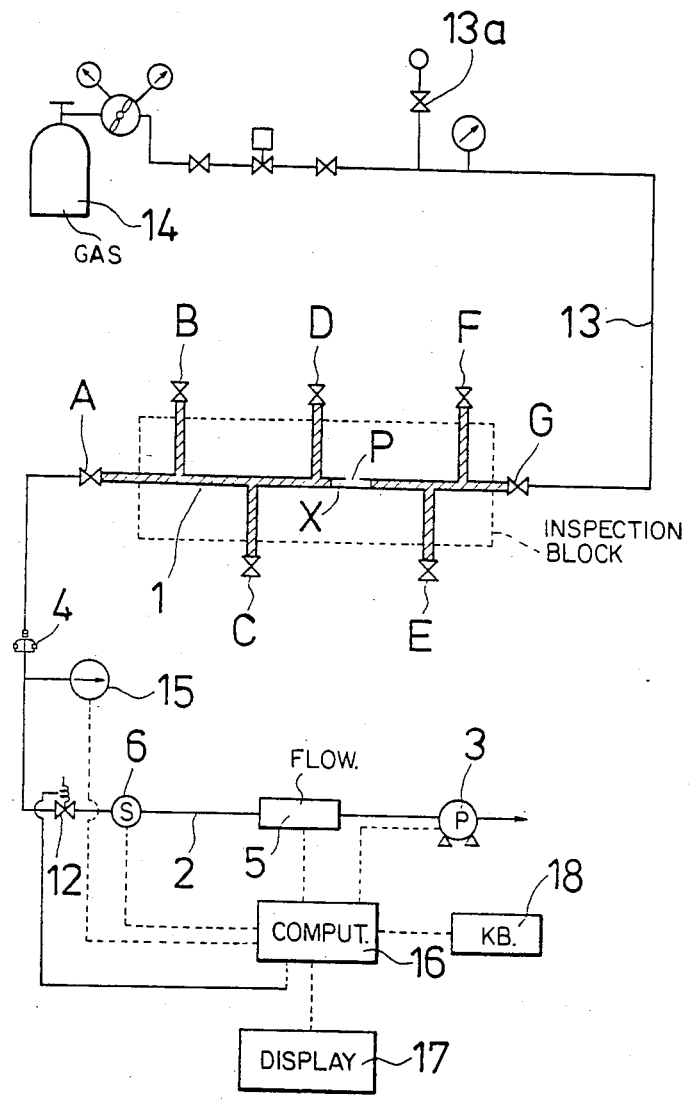
FIG. 1 is an explanatory view of the unit for practicing the present invention.
Figure 2:
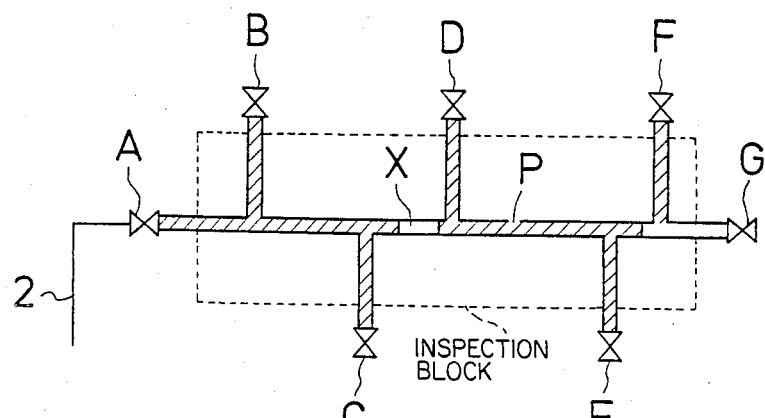
FIG. 2 is an explanatory view showing how air is sucked into an inspection block of pipes, according to the invention, and then moved therealong.

FIG. 1 shows a block of gas carrying pipes including a leak position of point P. Valves A and G are connected to opposite ends of a main pipe in the block 1. Moreover, valves B, C, D, E and F are installed at the terminal ends of branch pipes at are connected to the main pipe.

A suction line 2 is connected to the block of gas pipes 1 at valve A. An adaptor 4 is provided in suction line 2 for connection to valve A. A suction pump 3 is connected to a rear end of the suction line 2 so that the suction pump may be connected to the block of pipes 1. It is noted that in this embodiment of the invention, the suction pump 3 is designed so that it can also feed pressurized air into the interior of the pipe line by switching an electromagnetic valve. Suction pump 3 thus serves to draw suction and also to provide pressurized air. A separate pressurized air line can also be installed in addition to the suction pump 3, however.

A flow meter 5 is connected into the suction line 2 in order to measure the flow rate of gas flowing inside the suction line 2.

An oxygen or atmospheric gas sensor 6 is also connected into suction line 2 for measuring the oxygen density or the atmospheric density of gas flowing inside the suction line 2.

In cases where the leakage fluid is gas, which is presumed to stay stagnant in the neighborhood of the leak position, and this gas is sucked into the interior of the pipe in order to form an atmospheric gas layer therein, an atmospheric gas sensor is used as the sensor 6.

A shut-off valve 12 is installed in the suction line 2 in order to turn the suction line on and off. Valve 12 is a solenoid valve. A plurality of such solenoid valves can be used for changing over to various kinds of gas flow line circuits.

An infusion line 13 for inert gas or the like, is connected to valve G. Infusion line 13 can thus be used to infuse inert gas (for example nitrogen) into the inspection block 1 from a gas cylinder 14. Infusion line 13 is connected to the inspection block 1 by using an adaptor. A suction inlet 13a which is connected to infusion line 13, is capable of feeding air into the suction block 1 through the infusion line 13.

A pressure gauge 15 is connected to the suction line 2 in order to detect the pressure inside the inspection block 1 via the suction line 2.

A computing element 16 which is capable of calculating the distance from the suction line position up to the leak position P, is electronically connected to the sensor 6, the flow meter 5, the valve 12 and the pressure gauge 15. Computing element 16 calculates the distance between the suction position (at valve A, and the leak Position P, by dividing the volume of inert gas sucked by the suction pump, up until oxygen or atmospheric gas density starts to rise, by the sectional area of the pipe, on the basis of an input given to the computing element 6 by the flow meter 5 and an input given by the oxygen or atmospheric gas sensor 6. The computing element 16 also calculates the gas leakage volume by measuring the rate of pressure drop inside the inspection block 1 and functions to emit a control signal to the control valves in order to control pressurized air volume.

A display 17 displays the results of calculations by the computing element 16. A keyboard 18 is connected to the computing element 16 for inputting information into the computing element 16.

An example of how the above disclosed embodiment operates will now be given as a sequence of steps:

(a) First, the end valves A and G at both ends of the inspection block 1 which is presumed to contain the leak position P is closed. In addition, all of the branch valves B, C, D, E and F, are closed.

(b) Next, the adaptor 4 is used to connect the suction line 2 to one end of the inspection block 1. It is noted that the shut-off valve 12 is kept open at this time.

(c) Then, with valves A open, air is fed into the inspection block 1 by the use of pump 3, after its solenoid valve has been switched to cause pump 3 to act as a pressurized air pump, rather than as a suction pump. After this, valve 12 is closed to seal air in the inspection block and the initial pressure is taken using pressure gauge 15. In addition, the pressure drop after a certain period of time is measured, again using the pressure gauge 15. This pressure drop can be read out as a leak volume which occurred during the selected period of time and as calculated by the computing element 16.

(d) In situations where the inspection block 1 having the leak P is buried underground or covered by concrete, the next step of the method comprises the opening of valves B, C, D, E, F and G duct 13a is kept open for the purpose of feeding air into the inspection block 1 and by operating the pump 3. This replaces all of the gas that was initially inside the pipe line with air. Thereafter the pressure in the pipeline is raised by closing valves B, C, D, E, F and G. At this point, the air will overflow from the leak position P to the surroundings, forming an atmosphere of air in the vicinity of the leak P. The overflowing volume can be set automatically. In situations where the inspection block 1 having the leak P is not buried underground or covered by concrete another possibility is to shift the above-mentioned step (c) immediately to a next step (e) (to be described next) without causing the air to overflow (included in the present step (d)).

For the purpose of detecting the atmospheric gas layer which is formed around the leak position P, the next step (e) must be practiced without performing the control function in the step (d).

(e) This step comprises the feeding of inert gas or the like into the leak position block 1 from the infusion line 13, to replace all the original gas (air in step(d)) in inspection block 1 with inert gas or the like.

It is noted that this step of replacing all of the gas in the block of pipes 1 need only be taken when the gas in the pipe is combustion gas, for example fuel gas.

If the gas carried in the pipe poses no safety problems, the space inside the inspection block of pipes need not be replaced with inert gas. The block need only be shut off to seal the gas in the block. One then shifts immediately to step (f) below.

(f) Next, valves B, C, D, E, F and G, are closed and shut-off valve and valve A are opened. Suction pump 3 is then activated (in its suction mode of operation) to draw the inert gas (or original gas) from inspection block 1 and to reduce the pressure of inert gas (or original gas) in the pipe (inspection block 1) for an only stipulated time according to the level of leak volume which is taken by practicing step (c). This has the effect of building up or establishing an air layer or atmospheric gas layer X in the inspection block 1 in the vicinity of the leak point P.

(g) When the air or atmospheric gas layer X has been built up inside the inspection block, the air suction inlet 13a is opened. This also requires the opening of valve G. Pump 3 continues to operate to draw air into inlet 13a over infusion line 13 and into the inspection block 1 for moving the air or atmospheric gas layer X toward suction pump 3. During this operation, the oxygen or atmospheric gas density is continually monitored by the sensor 6.

It is noted that this step can be practiced by keeping the air suction inlet 13a closed while continuing to draw suction using the pump 3, and by simultaneously supplying inert gas from the cylinder 14 over the infusion line 13. Again, oxygen or atmospheric gas is simultaneously detected using gas sensor 6. This technique is much more effective in cases where the leak position P is situated in the block 1 very close to the air suction inlet 13a.

In this case, however, only a stipulated volume of inert gas is supplied. After the stipulated volume of inert gas has been drawn into the inspection block 1, the air suction inlet 13a is opened to thereafter supply air into the infusion line 13.

Figure 4:
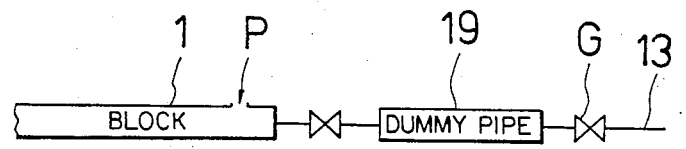
FIG. 4 is an explanatory view of another embodiment of the invention showing part of the end of inspection block 1 that is equipped with a terminal dummy pipe in the inspection block.

As illustrated in FIG. 4, it is also acceptable to connect a dummy pipe 19 to the end of the inspection block of pipes 1, between the block and the infusion line 13. The dummy pipe 19 is originally filled with inert gas or the like and sealed. After it is connected to the block 1, the inert gas from the dummy pipe 1a is supplied to the block 1 (after opening an interconnecting valve therebetween). At the same time, pump 3 operates to draw gases from the inspection block 1.

It is noted that in the case where pressurized inert gas is being fed from cylinder 14, over infusion line 13, to the inspection block 1 for moving the air or atmospheric gas layer X toward suction pump 3 without relying on suction of the inert gas layer, the inert gas can be fed into the interior of the inspection block 1 without opening the air suction inlet 13a, but once the air layer or atmospheric gas layer X has been formed inside the inspection block 1.

(h) When the air or atmospheric gas layer X has moved up to the location of the oxygen or atmospheric gas sensor 6, the sensor detects the increase in oxygen or atmospheric gas. Since sensor 6 is connected to the computing element 16, which also receives signals from the flow meter 5, a calculation can be made by the calculating element. This calculation comprises dividing the volume of inert gas that has been sucked by the sectional area of the pipe, by noting the detection of oxygen of the air layer or the atmospheric gas of the atmospheric layer. The results of this calculation are displayed in display 17, or are printed out.

What is more, if there is no leak position between the end valve A and G, this will be indicated since the oxygen or atmospheric gas density will not rise and the entire section block of pipe is assumed to be secure and free of leaks. This same procedure can be used between valves A and B, between valves C and D and between valves E and F, to establish whether a leak is present at these specific locations of the block 1. Since the distance between the position where the oxygen or atmospheric gas sensor 6 exists, and the position of the leak P, is displayed or printed out (being the result of the calculations), an inspector can physically measure the inspection line 1 and precisely locate the position of the leak point P. Digging can then commence over the leak point P for exposing the leak point and repairing it.

It is important that inert gas be infed or drawn into the inspection block 1 at the step (g). The reason for this is that if air is allowed to enter abruptly into the system from our suction inlet 13a, and where the leak position P is situated close to an end of the inspection block 1, air is diffused entirely through the block of pipes and over the air layer or atmospheric gas layer X. When this happens, the presence of the air or atmospheric gas layer X cannot be detected using the oxygen or atmospheric gas sensor 6. In other words, there will not be a noticeable increase in oxygen density of the air layer or atmospheric gas density of the atmospheric layer since the air will have intermixed with the inert gas, destroying the discrete layer of air or atmospheric gas layer X.

For example, in the event that the oxygen density of the air layer X being sucked from the leak position P is on the order of about 1%, when air is fed into the block 1 over the air suction inlet 13a, which air has an oxygen content as high as 21%, the aforementioned air layer X will be completely absorbed and diffused into the incoming air. This makes it impossible to detect the discrete air layer X, by means of the sensor 6.

Figure 3:
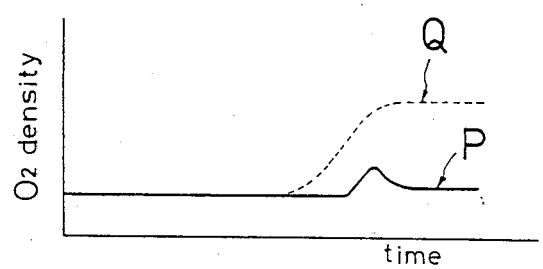
FIG. 3 is a graph showing an example of oxygen detection by means of an oxygen sensor.

FIG. 3 shows an example of the output of oxygen sensor 6 plotted over time. The solid line curve shows a peak in the detection of oxygen content at a discrete and clearly identifiable location, which corresponds to the leak position P. If, however, the leak position P is situated near a terminal end of the block 1 which is closest to the air suction inlet 13a, and should the inlet 13a be opened at the same time that suction of the inert gas from the block 1 commences, the air sucked from the inlet 13a will diffuse with the air layer X to absorb the air layer. As a result, the dotted curve Q in FIG. 3 will be observed. No clear position information is provided by this curve for the leak position P.

As noted above, it is also possible to supply inert gas into the block of pipes 1 by using the infusion line 13 and a dummy pipe 19 which is connected between the block 1 and infusion line 13. Dummy pipe 19 is previously filled with inert gas and sealed and interconnected between block 1 and infusion line 13 by valves, one of which is valve G in FIG. 4. By opening these valves, inert gas is drawn to the block 1 from the dummy pipe 19.

It is also noted that while the present invention has been disclosed in terms of the detection of the position of a leak in a gas pipe, leaks in pipes for carrying other types of fluids can also be detected using the techniques of the present invention. The gas being sealed into the inspection block along with the sensor may be changed accordingly, depending on the type of piping inspected.

According to the present invention, a calculation of the distance to a leak position can be obtained by first sealing an inert gas into the block of pipes containing the leak. Thereafter, inert gas is sucked from one end of the pipe to establish an air or atmospheric gas layer in the pipe. After this, suction is continued for the purpose of moving the air or atmospheric gas layer along the pipe. This is done by continuing the suction step and/or by providing inert gas to the opposite end of the pipe. The volume of inert gas moving along before the air or atmospheric gas layer is measured and divided by the cross-sectional area of the pipe. This gives an ongoing measurement of distance along the pipe. The oxygen sensor is then used to detect when the air or atmospheric gas layer has reached the known location of the sensor (by detecting a peak in reading as shown in FIG. 3). In this way, the distance between the sensor (which is known) and the leak position P (which is initially not shown) can be calculated. This information can then be used to commence digging or exposure of the pipe very close to the actual location of the leak.

The following advantages result from the present invention.

(a) The leak position can be located in a short period of time under any buried condition.

(b) Labor and time is saved for digging out the pipe since digging can be conducted only at the location of the leak. In this way, the entire pipe need not be dug out.

(c) In the case of a leakage in an indoor pipe, existing valves which are connected to the pipe can be used to practice the present invention, without requiring cutting of the pipe.

(d) The leak position, once located, can be correlated to a drawing which illustrates the pipe to exactly visualize where the leak has occurred.

(e) The present invention is simple in design and uses a microcomputer any special skills are not required.

(f) If the infusion line for the inert gas is connected to the terminal end of the inspection block, on an end of the block opposite from the suction end, it is possible to supply pressurized inert gas into the terminal end of the pipe to push the air or atmospheric gas layer through the inspection block. In this way, the suction pump can be used only for the step of forming the air or atmospheric gas layer initially. Thereafter, it is possible to push the gas layer X simply by using pressurized inert air or atmospheric gas without operating the suction pump. In this way, a suction pump of smaller capacity can be used and the time needed for moving the air or atmospheric gas layer may be reduced.

(g) When suction is used to draw the inert gas into the terminal end of the block of pipes 1, fear of having the air or atmospheric gas layer X invaded with air is reduced. This is particularly effective where the leak position is very close to the terminal end of the block nearest the infusion line.

We claim:

1. A method for locating the position of a leak in a pipe, comprising, filling the pipe with an inert gas, sealing the pipe with inert gas therein, drawing gas from a first end of pipe to reduce the pressure of gas in the pipe and to draw air into the pipe through a leak in the pipe to form an air layer in the pipe in the vicinity of the leak, opening an opposite end of the pipe, sucking the inert gas and the air layer from the first end of the pipe, in a direction toward the first-mentioned end of the pipe for moving the air layer toward the one end of the pipe away from the leak, continuously measuring the air density of gas leaving the one end of the pipe using a sensor at a known location, measuring the volume of inert gas being supplied to the opposite end of the pipe, the pipe having a known sectional area, and calculating the distance between the leak and the known location of the sensor by dividing the volume by the sectional area of the pipe, the volume of inert gas being measured from the time drawing begins until the detection of air at the sensor indicating the presence of air layer at the sensor after it has moved from the leak.

2. A method according to claim 1, including filling the pipe with air before the pipe is filled with inert gas, cause an overflow and storage of air through the leak in the neighborhood of the pipe.

3. A method according to claim 1, including drawing the inert gas into the opposite end of the pipe while sucking gas from the one end of the pipe so as to present the air layer from being disturbed.

4. A method according to claim 1, including supplying the inert gas into the opposite end of the pipe by feeding pressurized inert gas to the opposite end of the pipe so as to move the air layer in the pipe.

5. A method according to claim 1, including filling the pipe with inert gas by connecting a dummy pipe which is initially filled with inert gas and sealed, to the opposite end of the pipe, and opening communication between the pipe with the leak and the dummy pipe.

6. An apparatus for locating the position of the leak in a pipe which is between first and second opposite ends of the pipe, comprising:
   a suction line connected to the first end of the pipe;
   a flow meter in said suction line for measuring the flow of gas through the suction line;
   an oxygen sensor connected to the suction line for detecting a concentration of oxygen density in the gas of the suction line;
   an infusion line for inert gas connected to said second end of the pipe;
   an inert gas cylinder for containing an inert gas connected to said infusion line;
   gas suction means connected to said suction line for drawing gas from the pipe,
   a computing element connected to receive signals from said sensor and from said flow meter for calculating a volume of inert gas being sucked from the inside of the pipe by said suction means as a function of the cross-sectional area of the pipe and as a function of an indication from said sensor indicating the presence of an oxygen-containing layer of gas from the pipe from the vicinity of the leak in the pipe between said first and second ends thereof, said calculating unit operating to calculate the distance between the sensor and the position of the leak; and
   a display connected to said computing element for displaying the distance between the sensor and the position of the leak.

7. An apparatus according to claim 6, including an air inlet valve connected to the infusion line which is openable to admit air into said infusion line and through said second end into said pipe.

8. An apparatus according to claim 7, including a dummy pipe which is filled with inert gas and sealed, connected between said infusion line and said second end of the pipe, and valve means for establishing communication between said dummy pipe and said pipe with the leak.

* * * * *